US009268773B2

(12) United States Patent
Arango et al.

(10) Patent No.: US 9,268,773 B2
(45) Date of Patent: *Feb. 23, 2016

(54) SYSTEM AND METHODS FOR INTEGRATING AND USING INFORMATION RELATING TO A COMPLEX PROCESS

(75) Inventors: Guillermo Francisco Arango, Bellaire, TX (US); James Heaton, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 143 days.

This patent is subject to a terminal disclaimer.

(21) Appl. No.: 12/961,177

(22) Filed: Dec. 6, 2010

(65) Prior Publication Data
US 2012/0143899 A1    Jun. 7, 2012

(51) Int. Cl.
G06F 17/30    (2006.01)
G01V 1/46    (2006.01)
E21B 47/12    (2012.01)
E21B 47/00    (2012.01)
E21B 49/00    (2006.01)

(52) U.S. Cl.
CPC .......... *G06F 17/30017* (2013.01); *E21B 47/00* (2013.01); *E21B 47/12* (2013.01); *E21B 49/00* (2013.01)

(58) Field of Classification Search
CPC ..... E21B 49/00; E21B 47/00; G06F 17/5009; G06T 17/05; Y10S 367/911
USPC ............................. 702/6; 340/853.1; 707/736
See application file for complete search history.

(56) References Cited

U.S. PATENT DOCUMENTS

| 5,798,458 | A | 8/1998 | Monroe |
| 6,268,911 | B1 | 7/2001 | Tubel et al. |
| 6,434,435 | B1 | 8/2002 | Tubel et al. |
| 6,980,929 | B2 | 12/2005 | Aronstam et al. |
| 7,201,221 | B2 | 4/2007 | Tubel et al. |
| 7,511,612 | B1 | 3/2009 | Monroe |
| 2002/0149617 | A1* | 10/2002 | Becker .......................... 345/751 |
| 2004/0001214 | A1 | 1/2004 | Monroe |
| 2004/0075738 | A1* | 4/2004 | Burke et al. ................... 348/143 |
| 2004/0143602 | A1* | 7/2004 | Ruiz et al. ................... 707/104.1 |
| 2004/0158997 | A1* | 8/2004 | Tang ............................... 33/304 |
| 2004/0240855 | A1 | 12/2004 | Kagle |
| 2005/0240571 | A1* | 10/2005 | Haigh et al. ...................... 707/3 |

(Continued)

FOREIGN PATENT DOCUMENTS

WO    WO2007025807 A1    3/2007

OTHER PUBLICATIONS

International Seach Report and the Written Opinion of the International Searching Authority, or the Declaration for International Application No. PCT/US2011/062645: all references are cited above, Date: Apr. 10, 2012.

*Primary Examiner* — Jorge A Casanova
(74) *Attorney, Agent, or Firm* — Cantor Colburn LLP

(57) ABSTRACT

In aspects, the disclosure herein provides a method of obtaining and integrating information relating to a process. The method, in one configuration, includes obtaining information relating to the process in a first form that includes a plurality of images generated over a selected time period, obtaining information relating to the process in a second form, time synchronizing the information in the first form and the second form, integrating the time-synchronized information, and recording the integrated time-sequenced information in a suitable storage medium.

22 Claims, 4 Drawing Sheets

(56) References Cited

U.S. PATENT DOCUMENTS

| | | | |
|---|---|---|---|
| 2005/0267686 A1* | 12/2005 | Ward | 702/6 |
| 2006/0053455 A1 | 3/2006 | Mani et al. | |
| 2007/0003146 A1* | 1/2007 | Ko et al. | 382/224 |
| 2007/0118801 A1* | 5/2007 | Harshbarger et al. | 715/730 |
| 2007/0188657 A1 | 8/2007 | Basson et al. | |
| 2008/0162577 A1 | 7/2008 | Fukuda et al. | |
| 2008/0179094 A1* | 7/2008 | Repin et al. | 175/50 |
| 2008/0181230 A1* | 7/2008 | Hitt et al. | 370/395.1 |
| 2009/0006335 A1* | 1/2009 | Prager | 707/3 |
| 2009/0234584 A1* | 9/2009 | Casey et al. | 702/12 |
| 2010/0036393 A1* | 2/2010 | Unsworth | 606/130 |
| 2012/0050521 A1* | 3/2012 | Fitzpatrick et al. | 348/82 |

* cited by examiner

SYSTEM AND METHODS FOR INTEGRATING AND USING INFORMATION RELATING TO A COMPLEX PROCESS

BACKGROUND

1. Field of the Disclosure

This disclosure relates generally to recording, integrating and using information relating to process, such as wellsite process.

2. Brief Description of the Related Art

Complex processes include various phases and a variety of serial and parallel steps performed in each phase. Pertinent data or information is collected during the various process steps and used separately or in conjunction with other real-time or historical information to make decisions relating to the process. Often different individuals make decisions and perform different steps and at different locations, that can have a bearing on the outcome of other steps in the process. Sometimes different security levels are associated with different personnel, in that restrictions are imposed to filter which persons are privy to what type of data and which persons are authorized to make what decisions. One such process is the process of recovering hydrocarbons (oil and gas) from subsurface formations. Such a process includes drilling of a well or wellbore at a selected drilling site from a drilling platform, completing the wellbore for production, producing hydrocarbons from the competed well, monitoring production and performing secondary recovery operations (fracturing, stimulation, workover etc.). The drilling process alone generally involves various entities, such as one or more oil companies as the primary operator, drilling contractors to perform drilling operations, service companies to perform different operations based on the respective company's proprietary technologies, regulatory bodies and various other subcontractors. Various decisions are made by a variety of personnel prior to and during the drilling of a well and during post-drilling activities. For example, the oil company engineers may make early decisions relating to the location and profile of the well based on a variety of data, including, but not limited to, seismic surveys, data from nearby wells, environmental impact studies, and governmental regulations. Drilling contractor personnel perform drilling operations and make many decisions relating to the drilling operations based on real-time and other information, including, but not limited to, decisions made by the operators, downhole and surface sensor measurements, information relating to nearby wells, information received from remote locations, such as service companies, and measurements provided by service companies. The drilling site includes a platform, a variety of screens that display images of measurements of parameters relating to a drill string used for drilling the wellbore and parameters relating to the formation through which the well is being drilled. Decisions are made in meetings held among specialists from one or more entities and are then communicated to the driller. Communications among various personnel occur over different communication modes, such as audio conferencing, video conferencing, electronic mail (email), etc. Currently, much of such information is available in fragmented form. Some of the real-time information is not captured. Additionally, various types of interrelated information are not available in time-synchronized form and integrated or correlated form for real-time use or for performing analysis.

The disclosure herein provides a system and methods for capturing and integrating information relating to process for use contemporaneously with the process and for later use.

SUMMARY

In one aspect, the disclosure herein provides a method of obtaining and integrating information relating to a process. The method, in one configuration, includes obtaining information relating a plurality of images generated over a selected time period (first form), obtaining information relating to the process in a second form (such as text, audio, etc.), time synchronizing the information in the first form and the second form, integrating the time-synchronized information, and recording the integrated information on a suitable storage medium. The method may further include providing access to the integrated information to selected individuals and/or entities based on one or more defined criteria. The information may be accessed or queried in any suitable form, such as based on time, event, actor, venue, screen shots, type of sensor data, decisions made about an activity, etc. The method may further allow such individuals and/or entities to edit the accessed information (make comments and corrections, etc.) and store such edited information.

In another aspect, an apparatus for obtaining and integrating information relating to a process is disclosed. In one configuration the apparatus includes a controller or processor configured to: obtain information relating to the process in a first form that includes a plurality of images generated over a selected time period, obtain information relating to the process in a second form, time synchronize the information obtained in the first form and the information obtained in the second form, integrate the time-synchronized information, and record the integrated time-sequenced information on a suitable storage medium.

Examples of certain features of the apparatus and method disclosed herein are summarized rather broadly in order that the detailed description thereof that follows may be better understood. There are, of course, additional features of the apparatus and methods disclosed hereinafter that will form the subject of the claims appended hereto.

BRIEF DESCRIPTION OF THE DRAWINGS

For detailed understanding of the present disclosure, references should be made to the following detailed description, taken in conjunction with the accompanying drawings in which like elements have generally been designated with like numerals and wherein.

DETAILED DESCRIPTION

Figure 1:
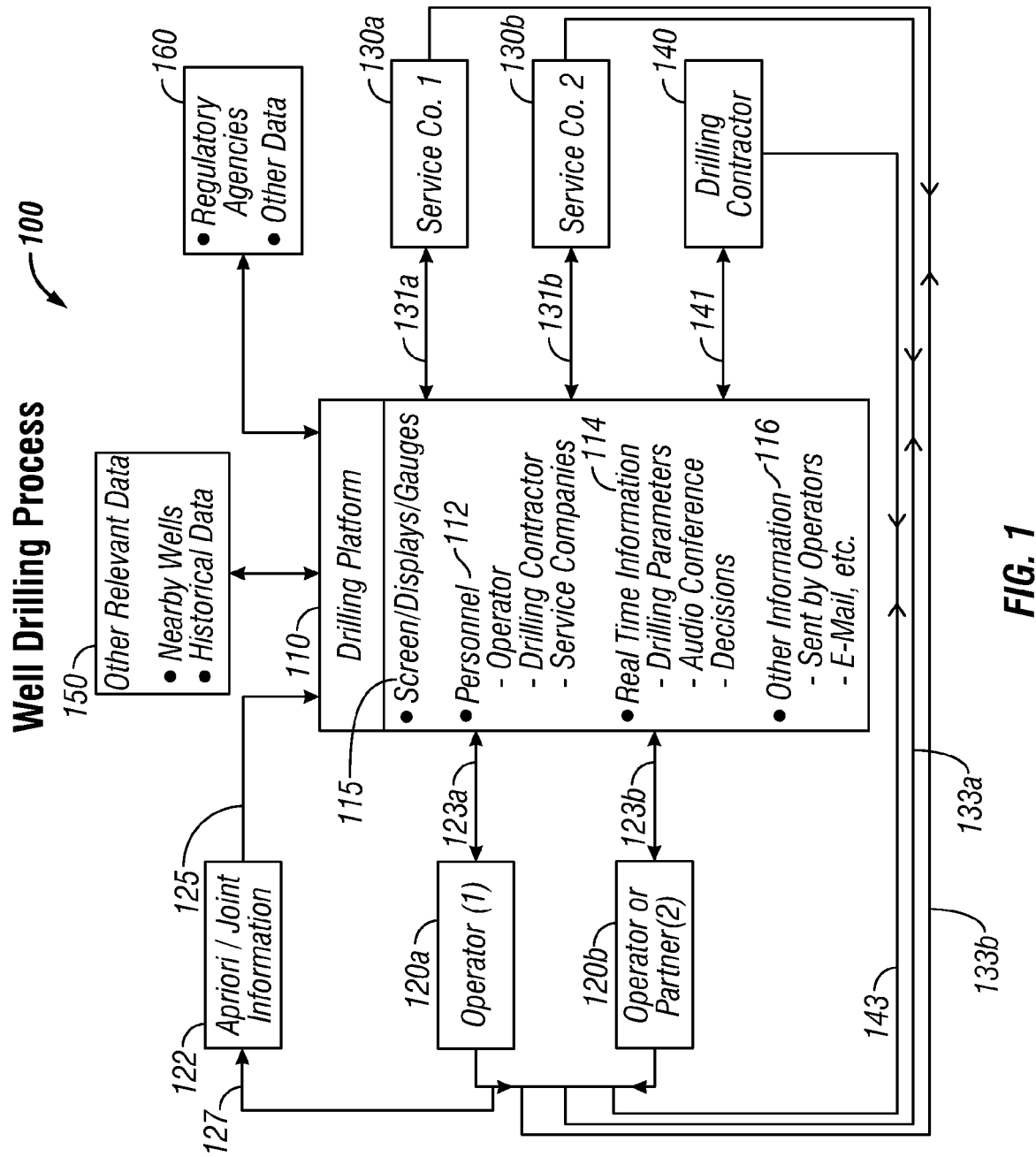
FIG. 1 is a functional block diagram of an exemplary well-drilling process about which information may be captured, integrated and used according to the various aspects of this disclosure.

The concepts, systems and methods disclosed herein are generally applicable to information generated in any process. Such concepts, systems and methods are particularly applicable to complex processes, including, but not limited to, the oil well-related processes, such as well-drilling, well-completion, well production, well maintenance (fracturing, stimulation, etc.) and well monitoring. The system and methods disclosed herein are equally applicable to other business, industrial and commercial processes that utilize information and data in a variety of forms during various steps of the process. In general, the disclosure provides systems and methods for capturing (recording) video information, still images (pixels), audio information (such as conferences, voice messages, etc.) and text (written) information relating to a process such as from emails and other documents). In the case of a well drilling process, such information includes, but is not limited to, screen shots at well site, audio and video information at well site, well logs, decisions made and the identity of persons making such decisions (written or verbal), data from remote locations (such as operators, service companies, etc.), historical data, data from near-by wells (for example, seismic data), regulatory information and compliance data. During post-drilling operations the captured or obtained information may include, but is not limited to, monitoring data (surface and subsurface), decision data, and fracturing and stimulation data, all in any suitable form (audio, video and text). The information captured relates to both subsurface and surface activities. In aspects, the captured information is enhanced, such as by time-synchronizing the captured information, integrating or correlating the captured information and/or time-synchronized information in a useful form and providing a variety of manners in which the enhanced information may be utilized by authorized users. The correlation may be based on one or more selected criteria, including, but not limited to, time, persons (actors) originating or involved in generating the information or performing an act, activity type, and place of occurrence (venue). In aspects, the system may provide access to the integrated and correlated information to individuals to the extent of their pre-authorization. The user, in aspects, may interface with the captured and enhanced information in a variety of ways. For example, a user may query information in a variety of ways, including, but not limited to, key-word, time, activity type or subject matter, person's name, place of activity, process step, audio relating to an activity, video relating to an activity, a parameter relating to the process, and all or a portion of the information. In another aspect, the user may view the information in a variety of manners, including, but not limited to, ability to play back, fast forward and pause while viewing such information. Such playback features may be provided in real or near-real time and/or at later times. In other aspects, based on the authority or clearance level, the user may edit (make corrections, add comments, etc.) and send such edited information back to the system for storage.

In aspects, the video information, screen shots, audio information, such as from meetings or conferences, text information, such as from emails, may be captured and recorded using any suitable method or devices. Emails at present tend to be the primary information sources for people executing steps of a business process, such as an oil well process. This information may be obtained through software screen captures or agents, or through hardware devices added to the audio and video systems. The information may be captured and transmitted in real or near-real time to a central source, recorded locally for later transfer or it may be transferred as the bandwidth becomes available via an appropriate quality of service setting. Because, the information captured for a complex process, such as a well process, can be extensive, a Data Drizzle technology may optionally be utilized. Data Drizzle technology enables a digital video recorder to operate without interfering with the bandwidth needed for real time operations, wherein data is transmitted a bit at a time, over time. It utilizes more bandwidth when available, and very little or none when the connection is busy. In another aspect, the captured and enhanced information may be compressed as various snapshots of the video data contain much common information and a differential comparison of screens allows a relatively small portion of the data to be transmitted in a compressed format. In other aspects, the system may perform time synchronization across systems to create a unified view of the video and audio information and display the same at points in time. It also may include built-in correction for time errors across systems by sending synchronizing audio sounds and/or video images to multiple systems. These artifacts may be used to correct a time offset and compute and correct for time drift.

The system may further record the identity of individuals using and contributing data and decisions. The system may further archive the recorded and integrated information along with the identity of individuals who have who have the right to access and the extent of such right to the information and under what conditions. The system allows access to the captured and integrated information based on access control rules. The system may further include record and escrow information to determine whether the information has been altered and log such acts and determine the identity of the person or persons who performed such acts and the timing of such acts. The system may optionally link any additional data (such as sensor data) from other systems (such as PLC and controls systems) into the sequence of screen shots and audio data to determine additional system status at the time of recording. The above-noted and additional features of the disclosure herein are described below in reference to FIGS. 1-4 relating to an exemplary well process for ease of explanation and not as any limitation. It should be noted that the concepts, systems and methods disclosed herein are equally applicable to other business, industrial, commercial and manufacturing processes.

FIG. 1 is a functional block diagram of an exemplary well drilling process 100 for which information may be captured, integrated, enhanced and made available for use by one or more parties according to the various aspects of this disclosure. The well drilling process 100 is shown to include a drilling platform (or platform) 110 at which actual well drilling activities occur. The platform 110 includes a rig and drilling equipment (not shown) for drilling wellbores. Typically, one or more operators, such as oil companies, contract with a rig operator to drill the well based on the design and other criteria provided by the operators. FIG. 1, as an example, shows two operators 120a and 120b who may have a joint development agreement that specifies the relationship between the operators relating to the drilling and completion process. Such agreements are typically confidential to operators. The operators communicate with each other via a suitable link 121 that may include video links, teleconference links, email and the like. The operators 120a and 120b provide information to the drilling contractor prior to the drilling of the wellbore as shown in box 122 via communication links 125 and 127. Such information may include a desired well profile to a desired depth and may include images and drilling criteria, decision process, etc. Such information may be communicated in text, video and/or audio forms and may be communicated by any suitable method, including emails.

Still referring to FIG. 1, the drilling of the well is performed by one or more drillers based on the criteria provided by the operators 120a and 120b and using common drilling practices. The platform 110 includes a variety of display screens (or screens) and gauges 115 for displaying images of a variety of drilling aspects and/or parameters relating to the drilling operations and gauges that provide specific real-time measurement information to the drillers during drilling of the well. The operators and/or the drilling contractor also contract with other entities to perform a variety of functions relating to the drilling and completion of the well. For example, operators may contract with service companies to provide the drill string that includes a variety of sensors for making downhole measurements while drilling. Such measurements relate to the drilling of the wellbore and the formation through which the well is being drilled. Such measurements are generally referred to as measurements-while-drilling ("MWD") or logging-while-drilling ("LWD") measurements. Service company personnel 112 present at the platform typically interpret such information in real or near-real time and communicate the results to the driller 112 and the operators 120*a* and 120*b*. Such measurements are displayed on the screens 115 at the platform 110. Thus, for a typical drilling operation, several images are simultaneously and continually or continuously displayed during the drilling process. The driller 112 makes ongoing drilling decisions based on real time downhole and surface measurements. Often, the operators 120*a* and 120*b* have remote offices that have experts that receive large amounts of data from the platform 110, including information about drilling parameters, MWD/LWD information, safety information, etc. Generally, the operators 120*a* and 120*b* are entitled to receive all data relating to the drilling and completion operations. The operators 120*a* and 120*b* individually or jointly communicate information and instructions to the personnel at the platform via two-way communication links 123*a* and 123*b*. Also, service companies 130*a* and 130*b* may have remote offices that receive information relating to the respective services provided by them. Communication link 131*a* provides two-way communication between service company 130*a* and platform 110, while link 130*b* provides the two-way communication between service company 130*b* and platform 110. Links 133*a* and 133*b* respectively provide two-way communication between the service companies 130*a* and 130*b* and the operators 120*a* and 120*b*. Similarly, drilling contractor personnel at remote location 140 may communicate with the platform 110 via link 141 and with the operators via link 143. Information received at the platform other than that generated at the platform is designated as 116. In addition, often in a well process, historical information, information from other wells and certain other information (collectively designated as 150) is utilized. Such information may include, but is not limited to, seismic data from nearby wells, placement of a nearby well, data (such as pressure and temperature gradients from previously drilled wells, rock formations at various formation depths, etc.). In addition, there may exist a body of regulations (for example, governmental or industry standards) 160 for various phases of the well process. Also, audit information may be available during the process. The system 100 also captures such information from the available sources. In addition, the system may be configured to capture value added information created during the process. Such information may include, but, is not limited to, quality control data and cautions and warnings issued, such as alarms activated and red flags raised during drilling.

Still referring to FIG. 1, at any time during the drilling process 100, images about various drilling aspects are displayed on various screens. Sequential images relating to a particular aspect are referred to as serial images and series of images relating to different images along the same time period (time line) are referred to as parallel images. An image may be related to or correspond to one or more variables. For example, an image of a downhole measurement is typically taken at a certain well depth (distance from the surface) and at a certain time. Thus, such an image corresponds to at least two variables, i.e., well depth and time. If a particular person (also referred to herein as an actor) provided some useful information or made a decision relating to that image, then such image also correlates or corresponds to that person. Additionally, such an image may also correlate to audio information, for example, a conference among individuals relating to a decision made. Thus, an image in a process, such as a drilling process, may be stand alone or may correspond to or be related to one or more variables, including time, place (such as well depth), one or more actors, audio information and written information. The enhancements herein may include integrating/correlating any other desired data, such as quality control analysis data, alarms and warnings occurring relating to one or more steps of the process. Also, it is common in complex processes for various personnel and/or associated computer systems to analyze the data in real-time, near-near-real time and/or at a later time date. Such analysis may, for example, include analyzing patterns, performing statistical analysis, and providing opinions and predictions. The system herein may also be configured to capture such data and integrate with other data. The system and methods for capturing or recording, enhancing (integrating/correlating) and using such information is described in reference to FIGS. 2-4.

Figure 2:
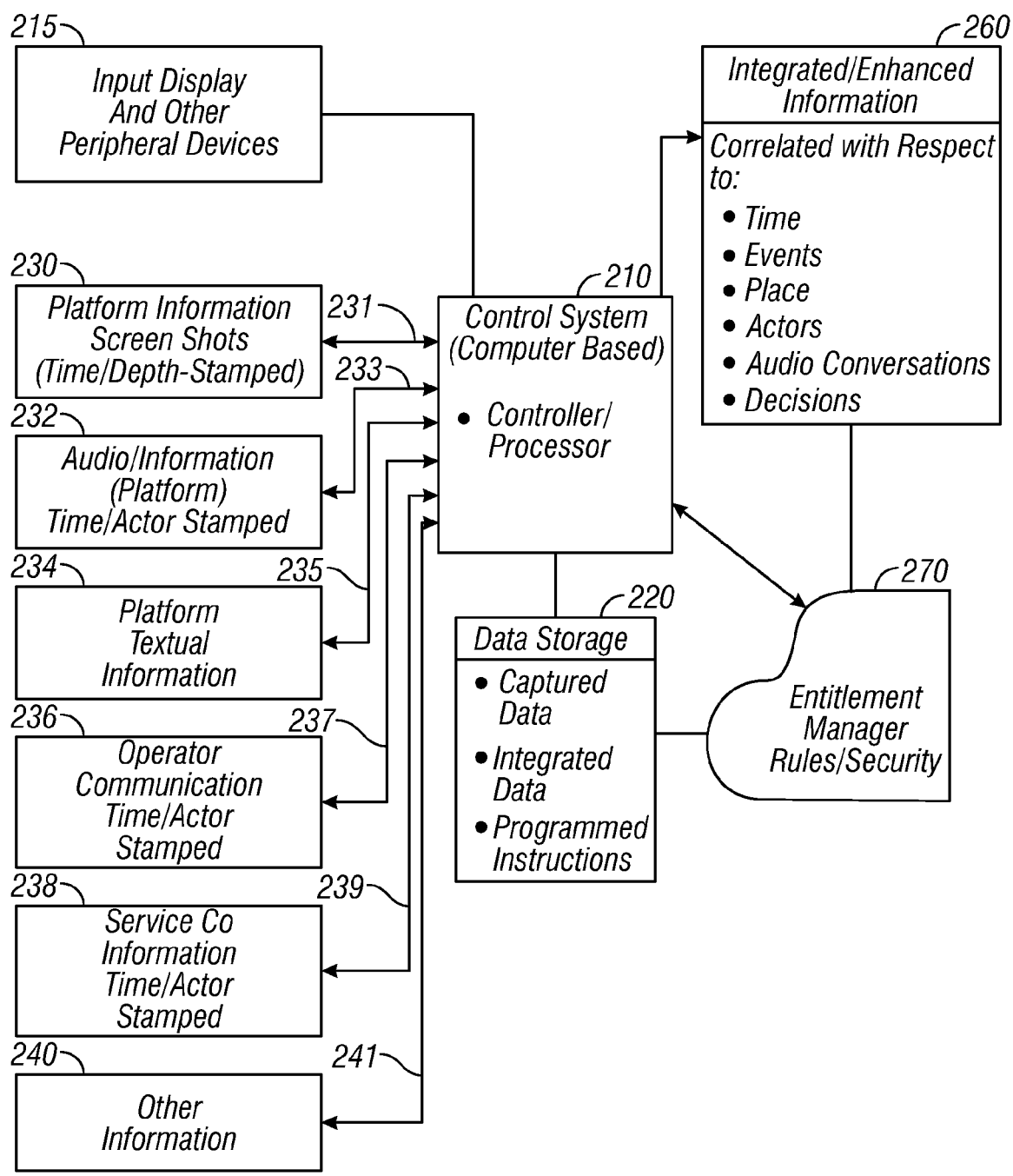
FIG. 2 is a functional block diagram of a system that may be utilized to capture, escrow and integrate information relating to a process, such as the process shown in FIG. 1.

FIG. 2 is a functional block diagram of a system 200 that may be utilized to capture or record, escrow and integrate information relating to a process, such as a drilling process shown in FIG. 1. The system 200 includes a control system or controller 210 that, in one aspect, may be a computer-based system that includes input, display and other peripheral devices 215 and a data storage device 220. The control system 210 is configured to capture all desired data and information from a well process, such as the drilling process described in reference to FIG. 1. The control system 210 may be configured to capture any information from the well process 100 shown in FIG. 1, including information at any location on the platform 110, and from operators, service companies, drilling contractors and the like. In FIG. 2, the control system 210 is shown to capture the images (screen shots) 230 at the platform via a communication link 231, audio information 232 from the platform 100 via link 233, text information 234 from the platform via link 235. Information, such as audio and text information from the operators 236 is received via link 237. Service company information 238 is received via link 239. The system 210 also may be configured to receive any other desired information 240 relating to the process of FIG. 1 via link 241. In one aspect, the images captured in real-time or near real time are time-stamped at the moment of capture. In one aspect, the images are time-stamped at the time they are generated. The audio information and the text information may also be time-stamped in the manner images are time-stamped. In addition, the control system 210 captures information about the identity of the actors relevant to the captured information. For example, the system 210 captures the identity of the persons responsible for making a decision in captured audio information or identity of the persons manning a station at the platform 100. Additionally, in certain aspects, it may be desirable to capture the location or place of the captured information, for example the platform 110, operator's remote office, etc. In the case of downhole information, the well depth corresponding to such information may be recorded. In general, the control system 210 may be configured to capture a variety of information relating to various steps of the process on an ongoing basis in real time or near real time. Additionally, other information may be provided to the control system 210 at different discrete times.

Figure 3:
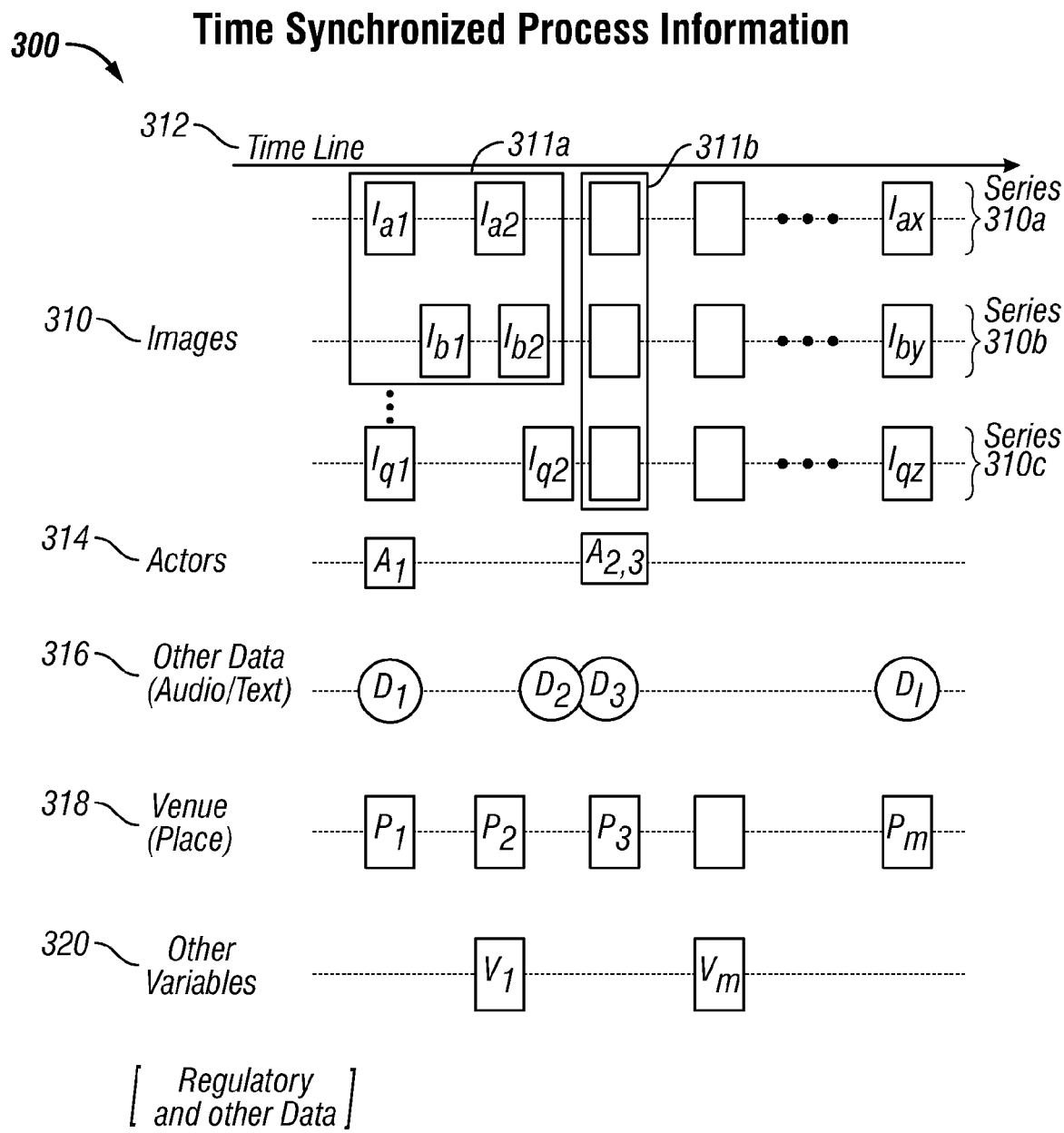
FIG. 3 shows a method of integrating captured video or visual images with other forms of captured information, according to one aspect of the disclosure.

Still referring to FIG. 2, the control system 210 archives or stores the received information in the storage device 220. The control system 210 integrates the various forms of captured information. FIG. 3 shows an example of the integration of the captured information, according to one aspect of the disclosure. The images 310 relating to a particular aspect of a process are shown in a sequential order I1, I2 . . . Ij. Such images have corresponding times (312) that are shown as T1, T2 . . . Tk. When each image has a corresponding time, j will equal k. However, if some images do not have a time-stamp, j and k will have different values. Often one or more actors may be associated with a particular image. FIG. 3 shows association of images with actors 314. Actor A1 is shown associated with image I1 and Actors A2 and A3 with image I3. In the particular scenario of exemplary FIG. 3, the remaining images do not have any associated actors. Audio and text data 316 associated with the images also may be integrated with their corresponding images. FIG. 3 shows that data D1 is associated with image I1, part of data D2 and all of data D3 are associated with image I3, while other images do not have any other associated data. Similarly, the location of the information captured may be associated or integrated with the images. As an example, FIG. 3 shows places P1, P2 . . . Pm are associated with images I1, I2 . . . Ij. Any other variables, such as V1, V2 etc., may also be integrated with the images. In this manner all relevant information relating to particular aspect or event of a process may be integrated into a common information set that may be made available or presented at the same time or substantially the same time.

Referring back to FIG. 2, the control system 210, in one aspect, integrates or correlates the captured information in a manner described in reference to FIG. 3 as shown in block 260 and stores such integrated information in a the storage medium 220 such as a non-transitory computer-readable medium or another suitable medium. In another aspect, the control system 210 has access to rules or criteria that define which party is entitled to what type of captured information and integrated information. Such rules may be provided to the control system 210 via an entitlement manager 270 or by another suitable manner. The entitlement manager receives inputs from one or more selected parties, such as the operators, service companies, etc. The control system 210 may be configured to provide in real-time or near real-time selected information as feedback to the various parties shown in FIG. 2, based on the rules dictated by the entitlement manager 270. Such information may then be utilized by such parties in making decisions regarding taking further actions relating to the drilling process and/or for auditing and forensic purposes.

Figure 4:
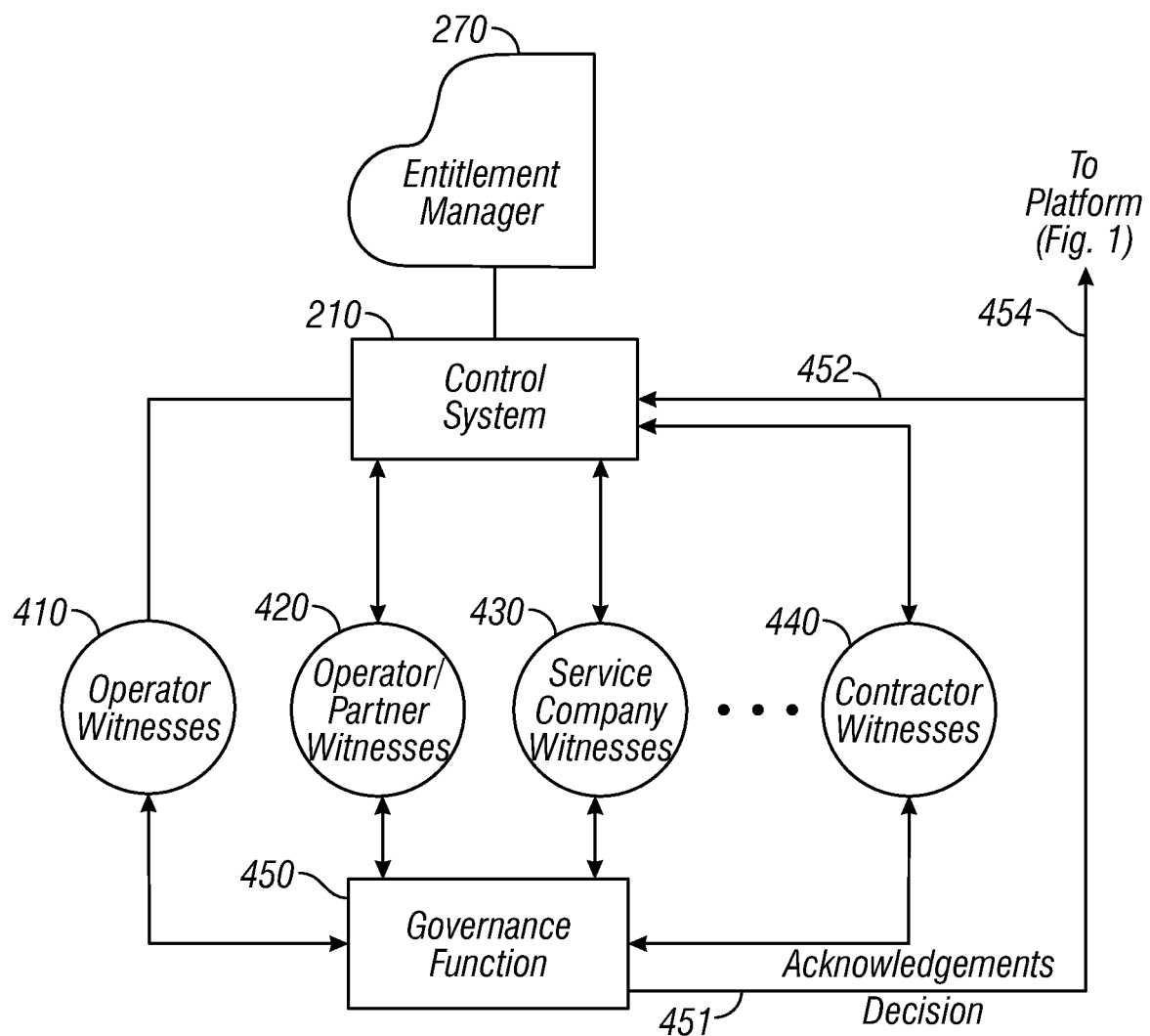
FIG. 4 is a functional block diagram of a system that may be utilized for providing access to the captured and integrated information provided by the system of FIG. 2 based on one or more selected rules, according to one embodiment of the disclosure.

FIG. 4 is a functional block diagram of a system that may be utilized for providing access to the captured information and integrated information generated by the control system 210 of FIG. 2. Often different individuals in different companies involved in a complex process, such as the drilling process, need information to make certain decisions. For example, specialists with an operator and a service company may need information captured and integrated as described in reference to FIG. 2 to make decisions relating to an aspect of the current drilling operation or for quality control purposes or to make decisions relating to another drilling operation or for forensic analysis in case of a failure or an anomaly. However, some such information may be confidential to a competitor of the service company, but not to the operator. For a variety of reasons, access to information is controlled by the entitlement manager 270. In one aspect, the control system 210 of FIG. 4 may be configured to control access to the captured and integrated information based on the rules provided to the entitlement manager 270. The control system 210 is configured to receive requests for information from various individuals, such as operator witness 410, operator partner witness 420, service company witness 430, and contractor witness 440. The control system using the rules of access disseminates the authorized information to the requestors. The requestors may then collaborate with each other based on their own rules of governance 450 and/or those mandated by a governing body. Any decisions made by the collaborating parties may be fed back to the control system 210 via link 452 for storage and/or integration and to the platform 110 (FIG. 1) for personnel action.

In another aspect, the system 210 may also be configured such that a legitimate recipient of information may perform a variety of functions on the received information. For example, the recipient may view the information in a still mode or in a continuous mode when the information is stored in a video mode. In another aspect, the recipient may pause, fast forward the information, go back to a previously viewed segment of the information and edit the information. The edits may include time stamps and the identity of the recipient. Any such information sent back to the system 210 may be stored and integrated with other information in the manner described in reference to FIGS. 2 and 3.

Thus, in aspects, the systems and methods disclosed herein can provide traceability of the information about any and every step in a process chain. In one aspect, the term traceability may be referred to as a substantial completeness of the information about one or more steps in a process. In another aspect, traceability may be defined as an unambiguous and substantially complete record of decisions and assumptions implemented and of the modes and data used in arriving at a given set of results for a process. In another aspect, the systems and methods provide a chain of custody of the information. The chain of custody provides an indication of the ownership of the information from the origination through a time period and may indicate any links of broken custody. In other aspects, the systems and methods herein provide the ability to track (identify and measure) all stages leading to a particular point in a process that consists of a chain of interrelated events. In another aspect, the systems and methods provide mechanisms to relate the captured and integrated information to selected references and standards (such as local standards set by an operator and national or international standards set by the industry or a governing body) through an unbroken chain of comparisons. The systems and methods also provide identification of the origin of captured information and personnel creating or interacting with the captured information.

The foregoing description is directed to certain embodiments for the purpose of illustration and explanation. It will be apparent, however, to persons skilled in the art that many modifications and changes to the embodiments set forth above may be made without departing from the scope and spirit of the concepts and embodiments disclosed herein. It is intended that the following claims be interpreted to embrace all such modifications and changes.

The invention claimed is:

1. A method of performing a well process, the method comprising:
   obtaining a first set of information in a first form of downhole measurements generated at a well platform over a selected time period as a result of the well process;
   obtaining a second set of information in a second form indicative of a decision made at the well platform in running the well process that affects the generation of the downhole measurements;

time-synchronizing the first set of information in the first form and the second set of information in the second form;

integrating the time-synchronized first set of information in the first form and the second set of information in the second form; and providing the integrated information to a well service operator based on an authorization of the well service operator to allow the well service operator to analyze the information to decide on a further action related to the well process, wherein the integrated information is provided without interfering with a bandwidth of the well process.

2. The method of claim 1, wherein the second set of information in the second form includes one of: (i) audio information; and (ii) text information.

3. The method of claim 1 further comprising correlating place of origin corresponding to at least one of the plurality of images and the second set of information in the second form.

4. The method of claim 1 further comprising correlating identity of individuals with the information those individuals have contributed.

5. The method of claim 1, wherein integrating the time-sequenced information further comprises correlating decisions made relating to particular information in at least one of the first set of information in the first form and the second set of information in the second form.

6. The method of claim 1, wherein the first set of information further includes sensor measurements taken downhole or at the surface.

7. The method of claim 1, wherein the first set of information is obtained in real time or near real time.

8. The method of claim 1 further comprising allowing access to the integrated time-sequenced information to persons based on a selected criterion.

9. The method of claim 8, wherein allowing access comprises allowing access by a query selected from a group consisting of: a word, an activity, a time period, an identity of a person, a parameter relating to the process; information relating to a place, an interaction between one or more persons; and an interaction between a person and an activity.

10. The method of claim 8 further comprising enabling the well service operation to perform a function on the accessed integrated time-sequenced information, which function is selected from a group consisting of: pausing the accessed information; fast forwarding the accessed information; going back to a point in the accessed information; and editing the information.

11. The method of claim 1 further comprising:
providing integrated time-sequenced information to one or more persons;
receiving edited integrated time-sequenced information from the one or more persons; and
updating the time-sequenced integrated information in response to the received edited integrated time-sequenced information.

12. An apparatus for performing a well process, the apparatus comprising a processor configured to:
obtain a first set of information in a first form of downhole measurements generated at a well platform over a selected time period as a result of the well process;
obtain a second set of information in a second form indicative of a decision made at the well platform in running the well process that affects the generation of the downhole measurements;

time-synchronize the first set of information in the first form and the second set of information in the second form;

integrate the time-synchronized first set of information in the first form and second set of information in the second form; and provide the integrated information to a well service operator based on an authorization of the well service operator to allow the well service operator to analyze the information to decide on a further action related to the well process, wherein the integrated information is provided without interfering with a bandwidth of the well process.

13. The apparatus of claim 12, wherein the second set of information in the second form includes one of: (i) audio information; and (ii) written information.

14. The apparatus of claim 12, wherein the controller is further configured to identify a place of origin of at least one of the plurality of images and second set of information in the second form.

15. The apparatus of claim 12, wherein the controller is further configured to identify an individual with at least one of the first set of information in the first form and the second set of information in the second form to which such individual has made a contribution.

16. The apparatus of claim 12, wherein to integrate the time-sequenced information, the controller is further configured to correlate decisions made relating to a particular information to one of the first set of information in the first form and the second set of information in the second form.

17. The apparatus of claim method of claim 12, wherein the first set of information further includes sensor measurements taken downhole or at the surface.

18. The apparatus of claim 12, wherein the first set of information is obtained in real time or near real time.

19. The apparatus of claim 12, wherein the controller is further configured to allow access to the integrated time-sequenced information to persons based on a defined criterion.

20. The apparatus of claim 19, wherein the controller provides access in response to a query selected from a group consisting of: a word, an activity, a time period, an identity of a person, a parameter relating to the process; information relating to a place, an interaction between one or more persons; and an interaction between a person and an activity.

21. The apparatus claim 12, wherein at least some of the information is obtained using one of: a data drizzle technology; and in a compressed form.

22. A non-transitory computer-readable medium including a set of instructions relating to a well process and accessible to a processor for executing the instructions, the instructions including:
obtain a first set of information in a first form that includes a plurality of images of downhole measurements generated at a well platform over a selected time period as a result of the well process;
obtain a second set of information in a second form that includes one of audio and text of a decision made in running the well process that affects the generation of the downhole measurements;
time-synchronize the first set of information obtained in the first form and the second set of information in the second form;
integrate the time-synchronized first set of information in the first form and the second set of information in the second form;
provide the integrated information to a well service operator based on an authorization of the well service operator to allow the well service operator to analyze the information to decide on a further action related to the well process, wherein the integrated information is provided without interfering with a bandwidth of the well process; and
store the integrated time-sequenced information in a suitable storage medium.

\* \* \* \* \*